C. F. SCHNEIDER.
NUT LOCK.
APPLICATION FILED NOV. 12, 1914.

1,196,034.

Patented Aug. 29, 1916.

Witnesses

Inventor
Charles F. Schneider
By
Attorney

UNITED STATES PATENT OFFICE.

CHARLES F. SCHNEIDER, OF OCALA, FLORIDA.

NUT-LOCK.

1,196,034. Specification of Letters Patent. Patented Aug. 29, 1916.

Application filed November 12, 1914. Serial No. 871,724.

*To all whom it may concern:*

Be it known that I, CHARLES F. SCHNEIDER, a citizen of the United States, residing at Ocala, in the county of Marion and State of Florida, have invented certain new and useful Improvements in Nut-Locks, of which the following is a specification.

This invention relates to improvements in nut-locks.

The invention has for its object to provide for effectively locking the nut against casual reverse movement or turning as from a transmitted jarring action, experienced especially in the rolling stock of railways or resulting from other cause.

A further object is to carry out that end in a simple, inexpensive and effective manner, and with facility.

The invention therefore consists of the structural features substantially as hereinafter fully disclosed and defined by the appended claim.

In the accompanying drawing is illustrated the preferred embodiment of my invention, wherein it will be understood that various changes and modifications as to the detailed construction and arrangement of parts may be made without departing from the spirit of the invention, and in which drawing—

Figure 1:
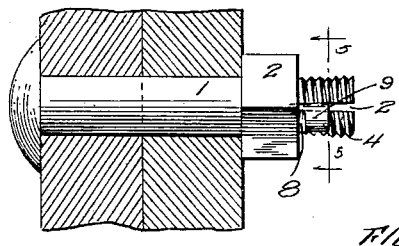
Figure 2:
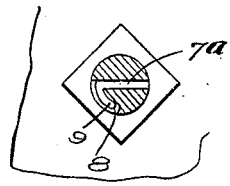
Figure 3:

Figure 1 is a longitudinal sectional view, partly in side view, showing a nut-equipped bolt embracing my invention. Fig. 2 is a vertical transverse section taken on the dotted lines 5—5 of Fig. 1, looking in the direction indicated by the arrows, and Fig. 3 is a detail perspective view of the key or wedge.

In carrying out my invention, I split a bolt 1 at its unheaded end, as at 2, to a suitable depth, say to the extent the bolt may extend beyond its usually equipped nut 3. The branches 4 resulting from thus splitting the bolt are spread or deflected sufficiently to cause the same to bind upon the outer edges of the wall of the bolt receiving orifice of the nut, accordingly providing for locking the nut upon the bolt. To further secure or hold the nut against working loose on the bolt, I provide a key or wedge 7ª, being somewhat tapered in cross-section, as clearly shown in Fig. 3, said key or wedge being insertible edgewise into the split end of the bolt to guard against possible springing together of the split end branches, with its taper presented inwardly, the latter conforming to the walls of the split and binding upon the edges of the walls of the bolt receiving aperture of the nut.

The threads of the bolt are mutilated or cut away, as at 8, and the key or wedge has a narrowed extension 9 which is bent down into the reduction formed by thus mutilating or cutting away the bolt-threads, as shown in Figs. 1 and 2 and whereby the nut will be securely locked against reverse rotation or working loose on the bolt.

I claim—

A nut-lock including a split-end nut-equipped bolt having its threads mutilated to produce a reduction, and a wedge insertible into the split of said bolt, said wedge having a narrowed extension for bending into said reduction of the bolt.

In testimony whereof I affix my signature in presence of two witnesses.

CHARLES F. SCHNEIDER.

Witnesses:
WM. H. HAFFEY,
JOHN MEIKLE.

Copies of this patent may be obtained for five cents each, by addressing the "Commissioner of Patents. Washington, D. C."